Nov. 29, 1938. F. D. KINNEY Re. 20,929
LENS AND METHOD OF MAKING SAME
Original Filed June 6, 1935 2 Sheets-Sheet 1
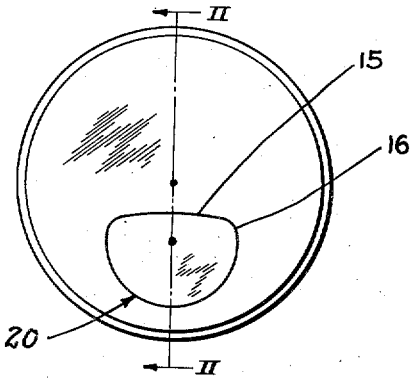
FIG. I
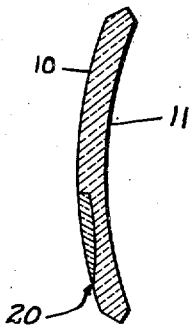
FIG. II
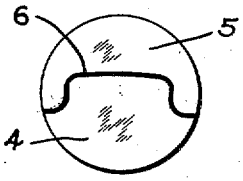
FIG. III
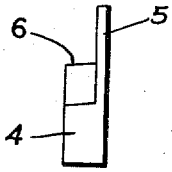
FIG. IV
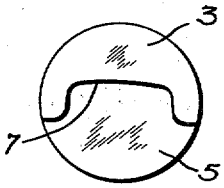
FIG. V
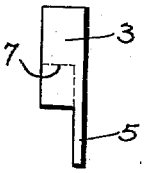
FIG. VI
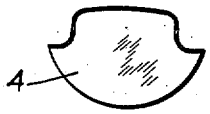
FIG. VII
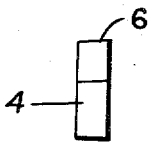
FIG. VIII
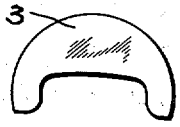
FIG. IX
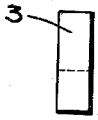
FIG. X
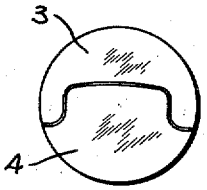
FIG. XI
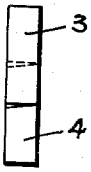
FIG. XII
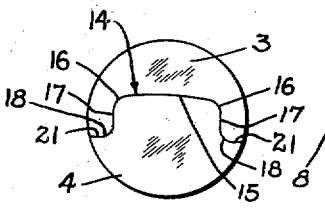
FIG. XIII
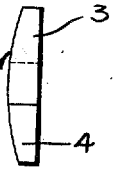
FIG. XIV
INVENTOR
Fay D. Kinney
BY
Harry H. Stull
ATTORNEY Nov. 29, 1938. F. D. KINNEY Re. 20,929
LENS AND METHOD OF MAKING SAME
Original Filed June 6, 1935 2 Sheets-Sheet 2
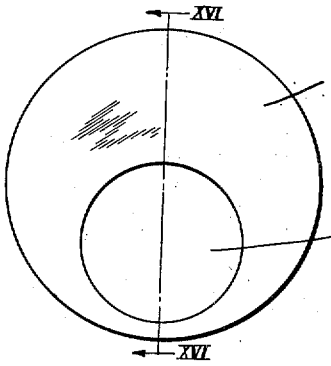
FIG. XV
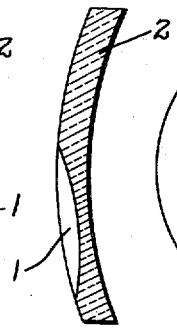
FIG. XVI
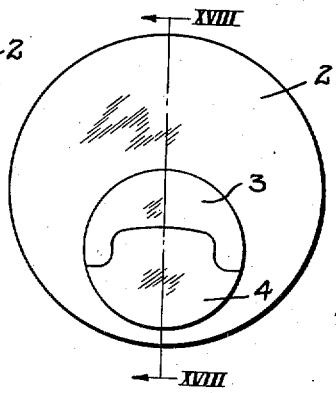
FIG. XVII
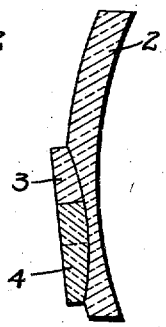
FIG. XVIII
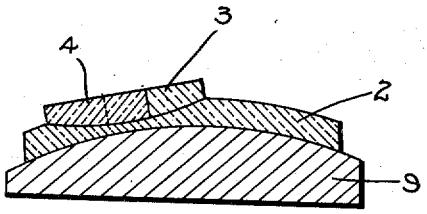
FIG. XIX
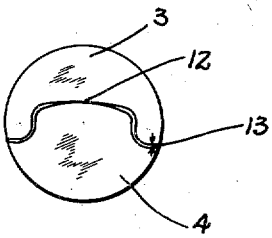
FIG. XX
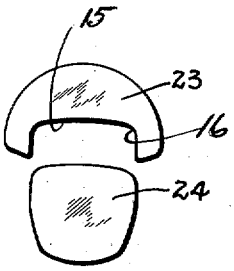
FIG. XXII
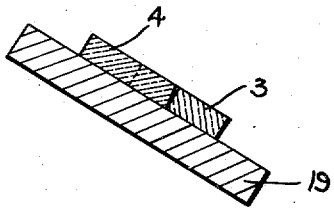
FIG. XXI
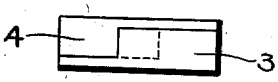
FIG. XXIII
INVENTOR
Fay D. Kinney
BY
Harry H. Stull
ATTORNEY Reissued Nov. 29, 1938

Re. 20,929

UNITED STATES PATENT OFFICE 20,929

LENS AND METHOD OF MAKING SAME

Fay D. Kinney, Southbridge, Mass., assignor to American Optical Company, Southbridge, Mass., a voluntary association of Massachusetts Original No. 2,067,194, dated January 12, 1937, Serial No. 25,225, June 6, 1935. Application for reissue September 1, 1938, Serial No. 228,001

7 Claims. (Cl. 88—54)

This invention relates to improvements in bifocal or multifocal lenses and has particular reference to an improved blank therefor and the method of making the same.

A principal object of the invention is to provide improved means and method of making bifocal or multifocal lenses and to reduce considerably the cost of production for the blanks of such lenses.

Another object of the invention is to provide an improved and less expensive method of fusing together multiple parts of the segment or button of such lenses where the line of jointure between the parts is of an irregular nature as contrasted with a division line having a single continuous line of jointure.

Another object of the invention is to provide means by which the joining lines of the segment or button parts may be finished for fusing in a more simple and less expensive manner than has been employed hitherto.

Another object of the invention is to provide an improved and less expensive method of producing a two part button or segment for lenses of this character wherein is provided means of producing a finished segment having a lower portion of circular outline and a transverse upper edge and an arcuate fillet at the junction of top and bottom edges.

Another object of the invention is to produce a button or segment for lenses of this character which will produce a finished segment with a lower portion of circular outline and of a knife edge thickness along this circular outline.

Another object is to provide a novel method for making a bifocal or multifocal lens blank having a reading segment with a transverse upper portion, a circular lower portion and fillets connecting said transverse and circular portions which is less expensive than methods heretofore employed.

Another object is to produce a bifocal or multifocal lens having a reading segment in which a portion of the contour of the finished blank is preformed and in which the remainder is formed by forming the base curve on the blank.

Another object is to provide a novel method of making a bifocal or multifocal lens blank having a reading segment which has a preformed upper portion with depending terminal portions, the remainder of the portions being formed by the intersection of the curve of the countersink of the major blank and the finished surface on one side of the blank and the depending portions serving as datum lines for determining the depth and position of said finished surface.

Another object is to provide a bifocal or multifocal lens having a reading segment having a preformed transverse upper portion with fillets depending therefrom and a lower circular portion formed by the intersection of the countersink curve for the reading segment and the base curve formed on the finished lens blank, said fillet portions serving as datum points with respect to which the upper extremities of the circular portion may be aligned during the formation of the base curve on the blank in order to properly locate said base curve on said blank and control the depth to which the base curve is formed.

Other objects and advantages of the invention will become apparent from the following description taken in connection with the accompanying drawings. It is apparent that many changes in the details of construction and arrangement of parts and in the steps of the process may be made without departing from the spirit of the invention as expressed in the accompanying claims. It is therefore not desired to limit the invention to the exact details and arrangement shown and described as the preferred forms only have been shown and described by way of illustration.

Referring to the drawings:

Fig. I is a front view of a finished lens blank embodying the invention;

Fig. II is a cross section on line II—II of Fig. I;

Fig. III is a front view of the bottom of the button or segment;

Fig. IV is an end view of Fig. III;

Fig. V is a front view of the top part of the button or segment;

Fig. VI is an end view of Fig. V;

Fig. VII is a front view of the bottom of the button or segment with the diaphragm removed;

Fig. VIII is an end view of Fig. VII;

Fig. IX is a front view of the top of the button or segment with the diaphragm removed;

Fig. X is an end view of Fig. IX;

Fig. XI is a front view of the top and bottom of the segment or button fitted and secured together;

Fig. XII is an end view of Fig. XI;

Fig. XIII is a front view of the top and bottom of the button or segment secured together and one face finished to fit the countersink of the major blank;

Fig. XIV is an end view of Fig. XIII;

Fig. XV is a front view of the major blank with the countersink therein;

Fig. XVI is a cross section on line XVI—XVI of Fig. XV;

Fig. XVII is a front view of the complete button or segment secured in place on the major blank;

Fig. XVIII is a cross section on line XVIII—XVIII of Fig. XVII;

Fig. XIX is a cross section of the complete lens blank in place on a fusing block;

Fig. XX is a view showing a modification of the manner in which the parts of the button fit together;

Fig. XXI is a cross section of the button illustrated in Figs. XI and XII showing the method of supporting the parts in place on a fusing block;

Fig. XXII is an elevational view showing a modification of the parts of the button; and Fig. XXIII is a side view showing the parts of the button interfitted with the diaphragms left on for the fusing operation.

Recent development in the optical trade has brought about a great demand for bifocal or multifocal lenses having a reading segment formed with a transverse upper portion, an arcuate lower portion with or without arcuate fillets connecting the arcuate portion and the transverse portion, such as shown in Fig. I. Practically speaking, it has been very difficult and expensive to produce a reading segment of such shape. Two methods have been used heretofore and both methods are very expensive. With my invention such a reading segment can be produced at a much lower cost than heretofore.

Prior to this invention it has been the practice to make the segment or button of lenses of this nature either by piercing a hole through one part of the button and inserting the other part therein, or by making the button in three parts and securing them together. In the prior art structures of this nature, the size and shape of the segment of the finished lens was predetermined by the size and shape of the hole or by the shape of the engaging edges of a plurality of pieces of glass which when assembled and fused would produce the finished contour of the reading segment. In both of these prior methods it was essential to finish the entire edge surfaces prior to the edge fusing operation. This was not only an expensive procedure but much difficulty was encountered in obtaining smooth and usable edge surfaces and in obtaining optically perfect fusion edges throughout the contour of the reading segments.

Another difficulty with structures of these types was that of reducing the reading segment to a feather-like edge throughout the lower portion thereof as the operator during the abrading operation could not definitely determine whether or not the proper depth had been reached. In many instances a thick edge was allowed to remain throughout the entire contour of the finished segment which was objectionable because it was visible and cast annoying reflections. Such reflections would not exist if the lower contour was reduced to a feather type edge.

It is a principal object of this invention therefore to avoid these difficulties and to reduce the cost involved by providing a portion of the contour of the segment with a preshaped shouldered transverse edge produced by edge fused surfaces which could be easily formed and the remainder of the contour with a feather type edge produced by the intersection of two curved surfaces, i. e. the countersink curve and the base curve of the lens. The shouldered transverse edge being provided with depending end portions or fillets with which the upper extremities of the lower curved edge of the segment are aligned to complete the shape of the segment. This controls the width and size of the finished reading segment of the lens. The depending ends or fillets provide definite gauge means by which the position and depth of the base curve of the lens may be easily controlled during the abrading operations.

Referring to the drawings wherein like reference characters denote like parts throughout, the major part of the lens as shown in Fig. XV is made in the usual prior art manner by making the countersink depression 1 in a glass blank 2. This countersink 1 is usually spherical and has a finished optical surface. The material of the blank 2 is preferably the usual optical crown glass with a desired index of refraction. This blank 2 may be of any color desired, of any required index of refraction coefficient of expansion, coefficient of dispersion, melting point, etc. and may possess any of the characteristics usual with lenses of this character.

The segment or button part, as shown in Fig. XIII, is made of two parts. The upper part 3 has preferably the same index of refraction as the major blank 2. The lower part 4 has a different index of refraction. The part 3 is preferably the same crown glass as the blank 2. The part 4 is preferably made of a barium crown glass or of flint glass of a different index from the part 3. The part 4 when made of barium crown glass, as is well known in the art, will reduce color defects because its dispersion is so related to the dispersion of the parts 3 and 2 as to produce a no color effect in the dispersion. It also has a lower melting point than the part 3. When made of flint glass the part 4 has a lower melting point than the part 3 but there will be color defects due to the fact that there is a difference in the dispersion from that of the part 3.

During the pressing operation on the parts 3 and 4 of the segment, an overflow must be provided and allowing the formation of the diaphragm 5 accomplishes this result. Also during fusion of the parts 3 and 4, the diaphragms may be used to prevent a distorted line of fusion. In such case, the diaphragms would, of course, be ground off after the fusion of the parts of the segment.

The part 3 is pressed under heat in a manner similar to that of the part 4 and also has the diaphragm 5 for the same reason. The parts 3 and 4 may be formed by using a forming tool or any other device known to the prior art, if desired. The contacting edges 6 and 7 may be sandblasted if desired or may be finished in any manner known to the prior art.

I next fit the two parts 3 and 4 together, as shown in Fig. XI, and preferably fuse them together. To fuse the parts together, I place them on a refractory block 19, see Fig. XXI. This block is inclined. The part 4 which has the lower melting point is placed above the part 3 so that when heat is applied the part 4 softens first and runs down by gravity to unite with the part 3. As clearly shown in Figs. IV and VIII, the edge 6 may be beveled slightly so that when the parts 3 and 4 fit together the edge of the surface 7 of the part 4 adjacent the fusing block will contact the part 3 on this edge leaving a wedge shaped clearance between the parts. Thus during fusion the part 4 becomes plastic and unites with the part 3 progressively from the contacting edge and forces any air or gases out of the useful part of the fusion line. I next finish the surface 8, see Fig. XIV, to fit the countersink 1 of the blank 2.

As shown in Fig. XXIII the parts 3 and 4 may be fitted and fused together before the diaphragms 5 are removed. This makes possible a better line of fusion throughout the thickness of the contacting edges of the parts.

After the parts 3 and 4 have been treated as described, I place the composite segment or button with the surface 8 in contact with the countersink 1, see Fig. XVIII, and place the assembled blanks on the refractory fusing block 9, see Fig. XIX, and apply heat to fuse the composite segment to the blank 2.

The parts 3 and 4 are united edge to edge along the line 14, see Fig. XIII. The line of jointure 14 comprises the transverse upper portion 15, arcuate fillets 16 at the outer extremities of the transverse portion 15; depending portions 17 joined to the fillets 16 and substantially parallel; and fillets 18 connecting the depending portions 17 and the outer terminal portions 21, which are substantially parallel to the portion 15. If desired the fillets 16 may be omitted and the portions 17 may extend from the transverse portion 15 and the angle the portions 17 make with the portion 15 will depend upon the shape of the segment desired. The essential feature of the invention resides in the provision of the button part 3 having the upper portion 15 and the terminating portions 16 or 17 with which the portion 20 may be aligned during the forming of the curve 10 on the lens blank.

The transverse portion 15 and the fillets 16 determine the shape of the upper portion of the finished segment. The depending portions 17 which together with the fillets 16 determine the width of the transverse portion and provide definite datum lines with respect to which the upper extremities of the lower circular portion 20 may be accurately aligned during the abrading operations to obtain a feather edge along the portion 20 as shown in Figs. I and II. The fillet portions 18 insure a better fusion line between the parts and also make the parts easier to mold. The outer portions 21 provide a visible line, the length of which may be very readily seen by the operator in order to tell how the base curve 10 on the blank is being formed with respect to the reading button 4 to form the lower circular portion 20. The portion 20 may be arcuate but not necessarily circular, depending on whether or not the countersink and curve 10 is spherical, torical or cylindrical.

After the composite blank has been made, as shown in Fig. XVII, the button or segment side is finished off to a spherical continuous optical surface 10, see Fig. II, as is usual in prior art practice. The surface of the countersink 1 being spherical and the surface 10 being spherical produces the circular outline 20 of the lower part of the finished segment, see Fig. I, as it is the intersection of two spherical surfaces. During the formation of the optical surface 10, the operator watches the visible portions 21 and adjusts the blank relative to the abrading apparatus so that the lengths of these lines 21 decrease in length simultaneously until the upper edges of the circular portion 20 aligns with the depending portions 17 which are continuations of the fillets 16. The operator also takes note of the vertical dimension of the finished segment, and if after the sides of the circular portion have aligned with the portions 17, the distance from the center of the transverse portion 15 to the lowermost point on the portion 20 is greater than the predetermined dimension, the blank is adjusted relative to the abrading apparatus so that the greater grinding pressure is applied to the lower part of the segment and thus cause the circular portion to move upward but maintaining its radius constant. When the final desired dimension is reached, the upper end of the circular portion 20 will join the lower ends of the fillets 16.

The circular portion 20 will have a knife edge substantially from fillet to fillet because the outline is produced by the intersection of the two spherical curves 10 and the countersink 1, while the transverse portion 15 and the fillets 16 will have a cliff-type edge. The manner in which the relation of the curve 10 is being ground on the blank may be controlled or varied in any manner well known in the prior art.

In the modification shown in Fig. XXII, the lower part of the reading segment indicated at 24 does not have the transverse terminal portions 21. The important thing is to maintain the upper part of the reading portion 24 having the higher index of refraction against distortion. This is accomplished by the shape of the part 23 having the higher melting point. During the forming of the surface 10, the surface is formed down until the upper portion of the circular outline 20 closes in and aligns with the fillets 16 due to the changing line of intersection of the two spheres. The outline 20 will also have a knife edge for the same reason. To finish the lens to prescription requirements, the opposite face is finished to the prescription surface 11. It may be either a spherical, toric or cylinder or in prismatic relation with the first surface.

Referring to Fig. XX, showing a modification of the invention, the parts 3 and 4 of the button or segment are shown in place for fusion, the part 4 being above the part 3 for the reasons set forth above. It will be noted that the part 4 contacts the part 3 at the point 12 substantially in the center of the dividing line, and also that there is a clearance 13 between the parts on either side of this point. During fusion the part 4 melts first and runs down toward the part 3, fusing from the point 12 outwardly on either side pushing out the air as it fuses and thus voiding air bubbles in the fused surfaces.

The finished lens has all the characteristics of the prior art lenses of this character as to, index of refraction, coefficient of expansion, coefficient of dispersion, color, melting points, oxidizing or anti-tarnishing effects, chemical compositions of the glasses and fusing characteristics, etc.

I have shown the invention applied to bifocal lenses. A trifocal or multifocal lens may be made in the same way by making the part 3 of different index of refraction from the part 2 or by making the part 4 of a plurality of pieces of glass of different indices of refraction fused together in edge to edge relation with each other.

It will be understood that if the part 3 is the same index of refraction as the part 2, the part 3 will disappear on fusion, merging with the part 2. If the glasses are of different index of refraction, the part 3 will remain visible and a trifocal lens will be produced.

Where the piercing and the three part methods are used, a much larger countersink in the blank 2 is necessitated which requires more grinding, and also there is required more grinding over the button to bring it to the finished condition, and unless an excessive amount of grinding is done, the button will have a thick edge because the portion beyond the segment has to be ground away before the segment is reached. It is difficult to determine when the segment is reduced to a knife or feather edge throughout the lower portion of the segment as the contour shape of this portion is not produced by the intersection of two spherical surfaces as disclosed by this invention. The segments of such structures are preshaped prior to the fusing and abrading operations and great care must be taken during the abrading of the base curve of the lens so that the said abrading is ceased just as the feather edge appears. The position of the base curve relative to the segment must also be carefully controlled so that the entire contour of the lower portion will be reduced to a feather edge simultaneously. These difficulties have been overcome by my method.

The parts 3 and 4 of the button have been particularly described as being formed by pressing, but it is to be clearly understood that I may grind or form the parts in any manner well known in the art. The line of jointure having fillets makes it particularly feasible to produce the contacting edges by a forming tool. Likewise, the contacting surfaces may be finished in any well known manner other than sandblasting as particularly described and I do not wish it to be understood that my invention is limited to sandblasting the edges.

If the parts 3 and 4 are formed by a forming tool instead of by pressing, the glass corresponding to the diaphragms 5 may not be left on during the other operations on the button. The parts 3 and 4 may also be fused together, as in Fig. XXIII, before the diaphragms are taken off, since a better line of fusion would be possible throughout the line of contact the full thickness of the parts.

It is to be understood that although the parts of the segments have been described as having specific shapes which are possibly of the greatest commercial value, these shapes are only illustrative for the purposes of clearly elucidating the invention. The invention primarily resides not only in producing reading segments in bifocal or multifocal lenses having these specific shapes by a more efficient and less expensive method, but also in producing other shapes of segments having noncontinuous contour lines by a less expensive method.

The broad concept of the invention contemplates the method of making a reading segment for a bifocal or multifocal lens in which a portion of the noncontinuous contour of the final shape of the reading segment is preformed and the remaining portion being formed by the intersection of the outer final surface of the lens blank with the surface of the countersink; the preformed portion serving as guides or datum lines for controlling the size and shape of the portion of the contour formed by the intersection of said surfaces.

The portion 15 has been described as substantially transverse and it is to be understood that this is intended to include a portion having long or short radius. The terminating portions 16 and 17 may be curved or straight. They are preferably straight because a greater tolerance may be possible without producing a sharp intersection of the portion 20 with the terminal portions 16 or 17. In any event these terminal portions form readily visible gauge lines for the operator during the formation of the surface 10. Although the countersink and base curve 10 are set forth as preferably being spherical, they may be made to any other desired curvature.

From the foregoing it will be seen that I have provided improved means for obtaining all the objects and advantages of the invention including a greatly reduced cost of production of lens blanks for lenses of this character. By this invention I have provided a novel lens blank for a bifocal or multifocal lens and method of making same, having a reading segment with a portion thereof having a preformed noncontinuous cliff-type edge and the remaining portion having a feather edge formed by the intersection of the countersink curve and the base curve on the blank. Thus, the preformed portion provides ready gauge means for the operator in order to produce an accurate lens. A lens made by my method will also be more optically perfect because where the piercing or three part methods are used the segment is entirely surrounded by the walls of the button, proper expansion and contraction and annealing cannot take place and strains are set up producing a warped condition destroying the true optical surface.

Having described my invention, I claim:

1. A multifocal lens blank for producing a lens having a reading segment formed with a circular lower portion and a transverse upper portion joined adjacent its ends with portions meeting the ends of the circular portion, comprising a major portion of glass of one index of refraction with a spherical countersink recess therein and a minor portion secured in said recess, said minor portion comprising two pieces of glass of different indices of refraction having portions abutted edge to edge transversely of the blank, one of said transverse edges having a central transverse section, deflected sections intermediate the ends thereof extending at an angle to and to one side of said central section and terminal offset end sections spaced from the central transverse section, said deflected sections forming portions of the side contours of the finished segment of the lens and being adapted, in the finished lens, to lie within the line of a circle generated by the intersection of the spherical surface of the countersink recess and a spherical surface formed on the segment side of the blank, said circular line being adapted to produce the lower circular portion of the segment of the finished lens with portions of the deflected sections meeting the ends of the lower circular portion and providing means for joining said ends with the ends of the central transverse portion to complete the contour of the segment, said terminal offset end sections located beyond said circle being adapted to disappear when the said spherical surface is generated on the segment side of the blank.

2. A multifocal lens blank for producing a lens having a reading segment formed with a circular lower portion and a transverse upper portion joined adjacent its ends with portions meeting the ends of the circular portion, comprising a major portion of glass of one index of refraction with a spherical countersink recess therein and a minor portion secured in said recess, said minor portion comprising two pieces of glass of different indices of refraction having portions abutted edge to edge transversely of the blank, one of said transverse edges having a central transverse section, deflected sections intermediate the ends thereof extending at an angle to and to one side of said central section and terminal offset end sections spaced from the central transverse section, said deflected sections forming portions of the side contours of the finished segment of the lens and being adapted, in the finished lens, to lie within the line of a circle generated by the intersection of the spherical surface of the countersink recess and a spherical surface formed on the segment side of the blank, said circular line being adapted to produce the lower circular portion of the segment of the finished lens with portions of the deflected sections meeting the ends of the lower circular portion and providing means for joining said ends with the ends of the central transverse portion to complete the contour of the segment, said terminal offset end sections located beyond said circle being adapted to disappear when the said spherical surface is generated on the segment side of the blank, the height of the segment being controlled by the relative positions of the axes of the spherical surface of the countersink and the spherical surface to be formed on the segment side of the blank and by the depth to which said last named surface is to be formed.

3. The method of making a multifocal lens blank having a reading segment having a transverse upper portion and a circular portion on the lower side, comprising forming a curved countersink in a major lens blank, forming a segment button of two pieces of glass of different indices of refraction with male and female lines of joinder, one of which has a central transverse section, deflected sections controlling the width of the finished reading segment of the lens and terminal offset end sections spaced from the central transverse section, securing said two pieces of glass together along said lines of joinder, securing said button in said countersink, and forming an optical surface on the segment side of the composite fused blank to such a depth as to cause the offset transverse end sections to close in until the said surface intersects the curve of the countersink and forms a circular contour throughout the lower portion of the segment and continuing the abrading of said surface until the lower circular contour approaches and meets the deflected end sections of the central transverse section whereby the said offset transverse end sections will disappear and the deflected end sections will form portions of the side contours of the finished reading segment of the blank.

4. The method of making a multifocal lens blank having a reading segment having a transverse upper portion and a circular portion on the lower side, comprising forming a curved countersink in a major lens blank, forming a segment button of two pieces of glass of different indices of refraction with male and female lines of joinder, one of which has a central transverse section, deflected sections controlling the width of the finished reading segment of the lens joined with the transverse section by curved fillets and terminal offset end sections spaced from the central transverse section, securing said two pieces of glass together along said lines of joinder, securing said button in said countersink, and forming an optical surface on the segment side of the composite fused blank to such a depth as to cause the offset transverse end sections to close in until the said surface intersects the curve of the countersink and forms a circular contour throughout the lower portion of the segment and continuing the abrading of said surface until the lower circular contour approaches and meets the deflected end sections of the central transverse section whereby the said offset transverse end sections will disappear and the deflected end sections will form portions of the side contours of the finished reading segment of the blank.

5. The method of making a multifocal lens having a reading segment having a transverse upper portion and a circular portion on the lower side, comprising forming a curved countersink in a major lens blank, forming a segment button of two pieces of glass of different indices of refraction with male and female lines of joinder, one of which has a central transverse section, reflected sections controlling the width of the finished reading segment of the lens and terminal offset end sections spaced from the central transverse section, securing said two pieces of glass together along said lines of joinder, securing said button in said countersink, and forming an optical surface on the segment side of the composite fused blank to such a depth as to cause the offset transverse end sections to close in until the said surface intersects the curve of the countersink and forms a circular contour throughout the lower portion of the segment and continuing the abrading of said surface until the lower circular contour approaches and meets the deflected end sections of the central transverse section whereby the said offset transverse end sections will disappear and the deflected end sections will form portions of the side contours of the finished reading segment of the blank and finishing the opposite side of the blank to a continuous optical surface.

6. The method of making a multifocal lens having a reading segment having a transverse upper portion and a circular portion on the lower side, comprising forming a curved countersink in a major lens blank, forming a segment button of two pieces of glass of different indices of refraction with male and female lines of joinder, one of which has a central transverse section, deflected sections controlling the width of the finished reading segment of the lens joined with the transverse section by curved fillets and terminal offset end sections spaced from the central transverse section, securing said two pieces of glass together along said lines of joinder, securing said button in said countersink, forming an optical surface on the segment side of the composite fused blank to such a depth as to cause the offset transverse end sections to close in until the said surface intersects the curve of the countersink and forms a circular contour throughout the lower portion of the segment and continuing the abrading of said surface until the lower circular contour approaches and meets the deflected end sections of the central transverse section whereby the said offset transverse end sections will disappear and the deflected end sections will form portions of the side contours of the finished reading segment of the blank, and finishing the opposite side of the blank to a continuous optical surface.

7. The method of making a multifocal lens having a reading segment having a transverse upper portion and a circular portion on the lower side, comprising forming a curved countersink in a major lens blank, forming a segment button of two pieces of glass of different indices of refraction with male and female lines of joinder, one of which has a central transverse section, deflected sections controlling the width of the finished reading segment of the lens and terminal offset end sections spaced from the central transverse section, securing said two pieces of glass together along said lines of joinder, securing said button in said countersink, and forming an optical surface on the segment side of the composite fused blank to such a depth as to cause the offset transverse end sections to close in until the said surface intersects the curve of the countersink and forms a circular contour throughout the lower portion of the segment and continuing the abrading of said surface until the lower circular contour approaches and meets the deflected end sections of the central transverse section whereby the said offset transverse end sections will disappear and the deflected end sections will form portions of the side contours of the finished reading segment of the blank and the remaining lower edge of the segment will have a knife-like edge, and finishing the opposite side of the blank to a continuous optical surface.

FAY D. KINNEY.